United States Patent
Deng et al.

(10) Patent No.: US 10,752,198 B2
(45) Date of Patent: Aug. 25, 2020

(54) VEHICLE AIRBAG

(71) Applicant: Ford Global Technologies, LLC, Dearborn, MI (US)

(72) Inventors: Zhibing Deng, Northville, MI (US); Deepak Patel, Canton, MI (US); Yun Cai, Canton, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 16/034,955

(22) Filed: Jul. 13, 2018

(65) Prior Publication Data

US 2020/0017055 A1 Jan. 16, 2020

(51) Int. Cl.
 *B60R 21/207* (2006.01)
 *B60R 21/2338* (2011.01)
 *B60R 21/235* (2006.01)

(52) U.S. Cl.
 CPC ........ *B60R 21/207* (2013.01); *B60R 21/2338* (2013.01); *B60R 2021/23386* (2013.01); *B60R 2021/23576* (2013.01)

(58) Field of Classification Search
 CPC .............. B60R 21/207; B60R 21/2338; B60R 2021/23386; B60R 2021/23576; B60R 2021/23146; B60R 21/23138; B60R 2021/23161
 See application file for complete search history.

(56) References Cited

U.S. PATENT DOCUMENTS

| | | | |
|---|---|---|---|
| 5,791,685 A | 8/1998 | Lachat et al. | |
| 8,360,469 B2 * | 1/2013 | Wiik | B60R 21/23138 280/730.2 |
| 8,480,123 B2 * | 7/2013 | Choi | B60R 21/231 280/730.1 |
| 8,851,511 B1 * | 10/2014 | Volkmann | B60R 21/23138 280/730.2 |
| 9,469,286 B2 | 10/2016 | Sugimoto | |
| 9,592,788 B2 | 3/2017 | Wiik et al. | |
| 9,623,831 B1 | 4/2017 | Deng et al. | |
| 9,688,234 B2 | 6/2017 | Yamanaka et al. | |
| 2006/0119082 A1 * | 6/2006 | Peng | B60R 21/23138 280/730.2 |
| 2006/0119083 A1 * | 6/2006 | Peng | B60R 21/207 280/730.2 |
| 2011/0049852 A1 * | 3/2011 | Kibat | B60R 21/23138 280/743.2 |
| 2015/0367811 A1 * | 12/2015 | Kobayashi | B60R 21/23138 280/730.2 |
| 2017/0158158 A1 | 6/2017 | Thomas | |
| 2017/0232922 A1 * | 8/2017 | Wiik | B60R 21/23138 280/730.2 |
| 2019/0061675 A1 * | 2/2019 | Kwon | B60R 21/23138 |

FOREIGN PATENT DOCUMENTS

JP 5003631 B2 2/2010

* cited by examiner

*Primary Examiner* — Drew J Brown
(74) *Attorney, Agent, or Firm* — Frank A. MacKenzie; Bejin Bieneman PLC

(57) ABSTRACT

An assembly includes a seatback. The assembly includes a side airbag supported by the seatback and inflatable to an inflated position including a top panel having a pair of opposing side edges and a front edge extending between the side edges. The side airbag includes a main panel fixed to the top panel at a seam extending along the side edges and the front edge.

18 Claims, 5 Drawing Sheets

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
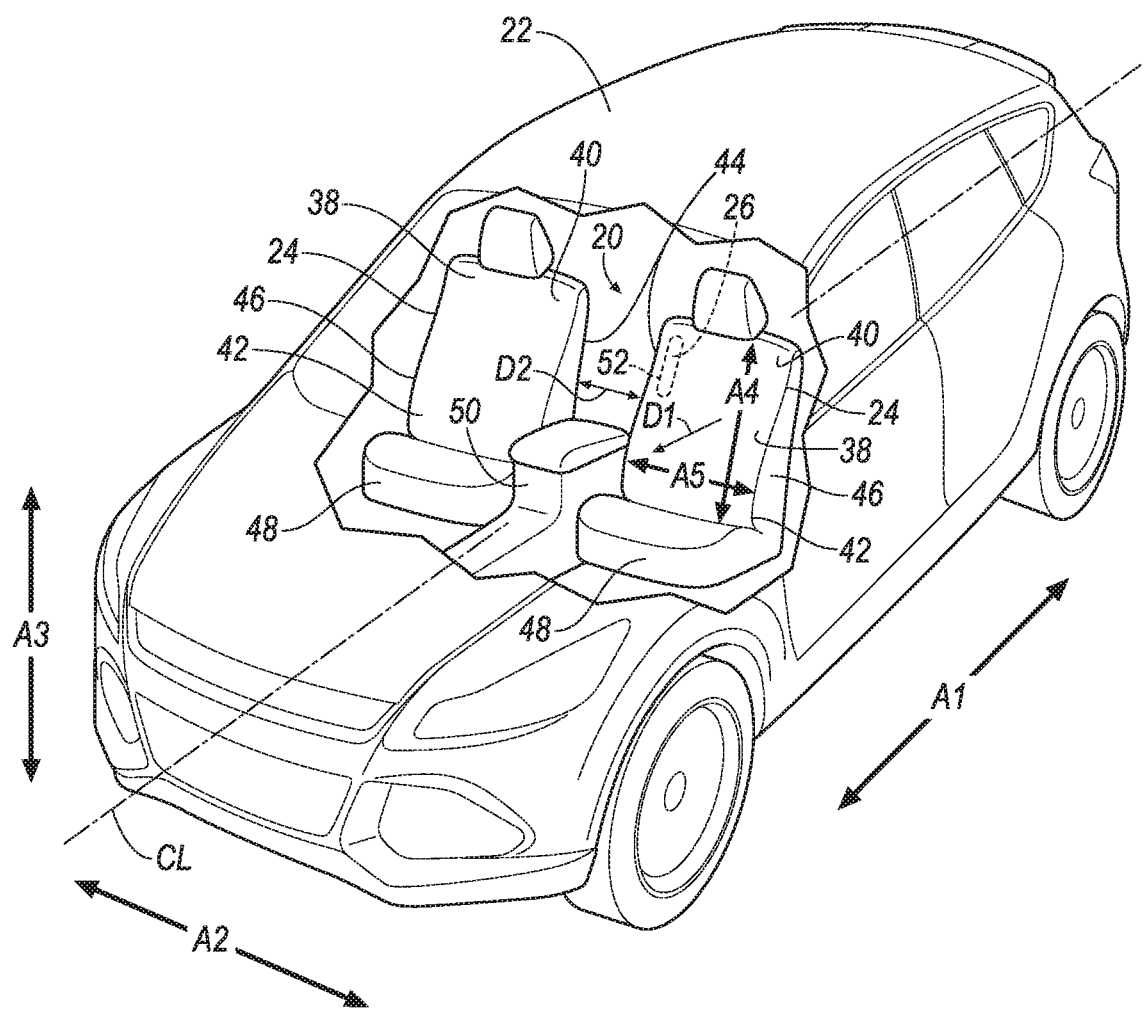
FIG. 1 is a perspective view of a vehicle with an airbag in an uninflated position.

An assembly includes a seatback. The assembly includes a side airbag supported by the seatback and inflatable to an inflated position including a top panel having a pair of opposing side edges and a front edge extending between the side edges. The side airbag includes a main panel fixed to the top panel at a seam extending along the side edges and the front edge.

The side airbag in the inflated position may include a bottom panel, the main panel extending from the top panel to the bottom panel in the inflated position.

The bottom panel may include a pair of opposing side edges and a front edge extending between the side edges, the main panel fixed to the bottom panel at a second seam extending along the side edges and the front edge of the bottom panel when the side airbag is in the inflated position.

A distance between the seam and the second seam at the seatback may be less than a distance between the seam and the second seam at the front edge of the bottom panel.

The assembly may include a tether fixed to the bottom panel and the seatback.

The tether may be triangular.

The assembly may include a tether fixed to the top panel and the seatback.

The main panel may be a single sheet of material.

The side airbag may be inflatable in a seat-forward direction from an uninflated position to the inflated position.

The seam at one of the side edges of the top panel may be spaced from the seam at the other of the side edges along a cross-seat axis.

The opposing side edges of the top panel may be spaced from each other by at least 50 millimeters in the inflated position.

The top panel may be domed upwardly from the seam.

The seam may be U-shaped.

The seam may extend from a first end to a second end, the first end and the second end at a same position relative to a seatback-vertical axis.

An assembly includes a seatback having a vehicle-inboard side. The vehicle includes an airbag supported by the seatback at the vehicle-inboard side and inflatable to an inflated position including a top panel having a pair of opposing side edges and a front edge extending between the side edges. The airbag includes a main panel fixed to the top panel at a seam extending along the side edges and the front edge.

The assembly may include a second seatback spaced from the seatback along a cross-vehicle axis by a distance, and the side edges of the top panel may be spaced from each other along the cross-vehicle axis by at least half the distance between the seatback and the second seatback.

The assembly may include a center console, and the airbag in the inflated position may be directly above the center console.

The assembly may include a seat bottom supporting the seatback, the airbag in the inflated position extending along the seat bottom.

The seam may extend along a cross-vehicle axis and a vehicle-longitudinal axis.

The airbag in the inflated position may include a bottom panel spaced from the top panel along a vehicle-vertical axis, and the main panel may be fixed to the bottom panel at a second seam extending about the bottom panel.

With reference to the Figures, wherein like numerals indicate like parts throughout the several views, an assembly 20 for a vehicle 22 includes a seatback 24 and an airbag 26 supported by the seatback 24. The airbag 26 is inflatable to an inflated position including a top panel 28 having a pair of opposing side edges 30 and a front edge 32 extending between the side edges 30. The airbag 26 includes a main panel 34 fixed to the top panel 28 at a first seam 36 extending along the side edges 30 and the front edge 32. The adjectives "first" and "second" are used throughout this document as identifiers and are not intended to signify importance or order.

The airbag 26 in the inflated position controls lateral movement of an occupant of the vehicle 22. Specifically, the top panel 28 provides sufficient width to a top of the airbag 26 to limit an amount of head excursion of the occupant during a vehicle side impact, as described further below.

The vehicle 22 may be any passenger or commercial automobile such as a car, a truck, a sport utility vehicle, a crossover vehicle, a van, a minivan, a taxi, a bus, etc. The vehicle 22 may define a vehicle-longitudinal axis A1, e.g., extending between a front and rear of the vehicle 22. The vehicle 22 may define a cross-vehicle axis A2, e.g., extending between a left side and a right side of the vehicle 22. The vehicle 22 may define a vehicle-vertical axis A3, e.g., extending between a top and a bottom of the vehicle 22. For example, the vehicle-vertical axis A3 may be vertical. The vehicle-longitudinal axis A1, the cross-vehicle axis A2, and the vehicle-vertical axis A3 may be perpendicular to each other. The front, rear, top, bottom, left and rights sides, etc., may be relative to an orientation of the occupant of the vehicle 22. The front, rear, top, bottom, left and rights sides, etc., may be relative an orientation of controls for operating the vehicle 22, e.g., an instrument panel. The front, rear, top, bottom, left and rights sides, etc., may be relative a driving direction of the vehicle 22 when wheels of the vehicle 22 are all parallel with each other, etc. The vehicle 22 may define a centerline CL that bisects the vehicle 22, e.g., elongated along the vehicle-longitudinal axis A1 and midway between the right side and left side of the vehicle 22.

The vehicle 22 includes one or more seats 38. Each of the seats 38 is shown as a bucket seat, but alternatively the seats 38 may be a bench seat or another type of seat. The seats 38 may be supported by a floor of the vehicle 22.

The seat 38 may include the seatback 24. The seatback 24 has a top 40. The seatback 24 has a bottom 42 opposite the top 40. The seatback 24 has a vehicle-inboard side 44 and a vehicle-outboard side 46 opposite the vehicle-inboard side 44. The vehicle-inboard side 44 is closer to the centerline CL than the vehicle-outboard side 46. The seatback 24 defines a seatback-vertical axis A4, e.g., elongated between the top 40 and the bottom 42 of the seatback 24. The seatback 24 defines a cross-seat axis A5, e.g., elongated between the sides 44, 46 of the seatback 24.

The seat 38 may include a seat bottom 48. The seat bottom 48 may support the seatback 24, e.g. at the bottom 42 of the seatback 24. The seatback 24 may be stationary or movable relative to the seat bottom 48.

The seat 38 defines a seat-forward direction D1. The seat-forward direction D1 may be relative to the occupant of the seat 38. For example, the seat bottom 48 may extend from the seatback 24 in the seat-forward direction D1.

The seat bottom 48 and/or the seatback 24 may include a frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

Figure 4:
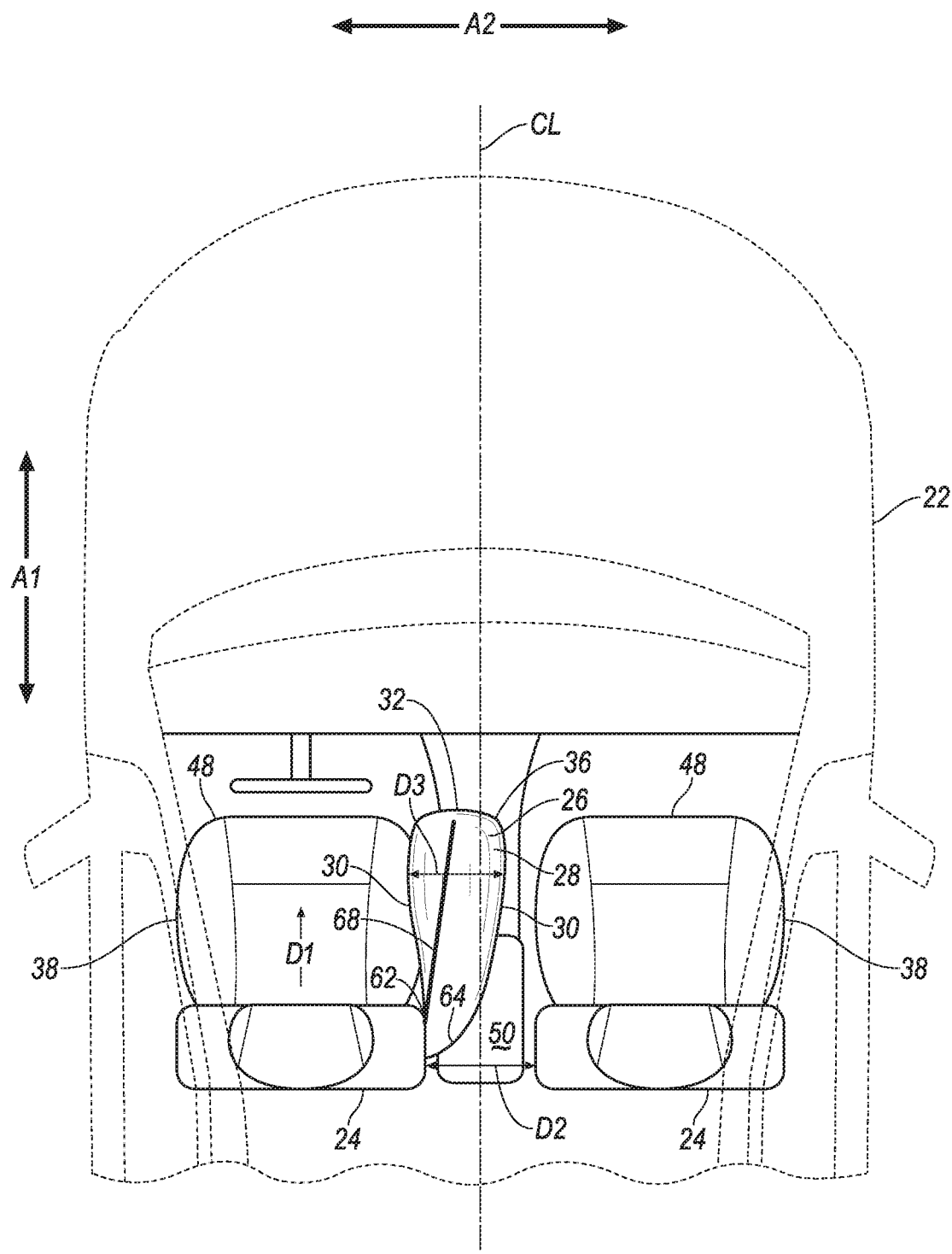
FIG. 4 is a top view of the vehicle with the airbag in the inflated position.

The seats 38 may be spaced from each other, e.g., along the cross-vehicle axis A2. Accordingly, the seatback 24 of one of the seats 38 may be spaced from the seatback 24 of another of the seats 38 along the cross-vehicle axis A2. Such seatbacks 24 may be spaced from each other by a distance D2. The distance between the seatback 24 may be between the vehicle-inboard sides 44 of such seatbacks 24, as shown in FIG. 4.

The vehicle 22 may include a center console 50. The center console 50 may be between the seats 38. The center console 50 may be elongated along the vehicle-longitudinal axis A1. The center console 50 may be at the centerline CL.

The airbag 26 may be formed of a woven polymer or any other material. As one example, the airbag 26 may be formed of woven nylon yarn, for example, nylon 6-6. Other examples include polyether ether ketone (PEEK), polyether-ketoneketone (PEKK), polyester, etc. The woven polymer may include a coating, such as silicone, neoprene, urethane, etc. For example, the coating may be polyorgano siloxane.

The airbag 26 is supported by the seatback 24. For example, the airbag 26 may be supported via a housing 52 fixed to the frame of the seatback 24. The airbag 26 may be at the vehicle-inboard side 44 of the seatback 24. In other word, the airbag 26 may be closer to the vehicle-inboard side 44 than the vehicle-outboard side 46.

Figure 2:
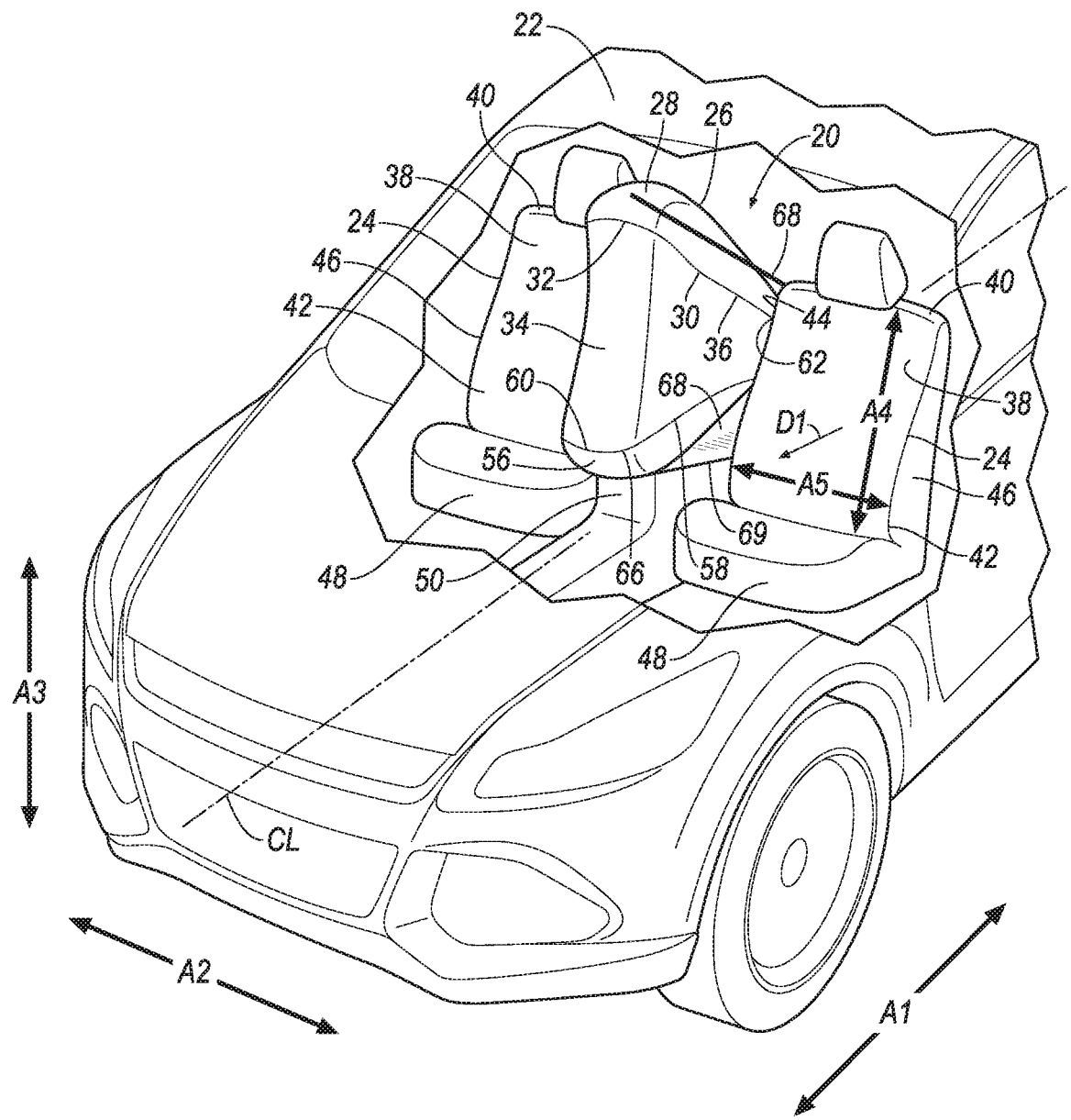
FIG. 2 is a perspective view of the vehicle with the airbag in an inflated position.
Figure 3:
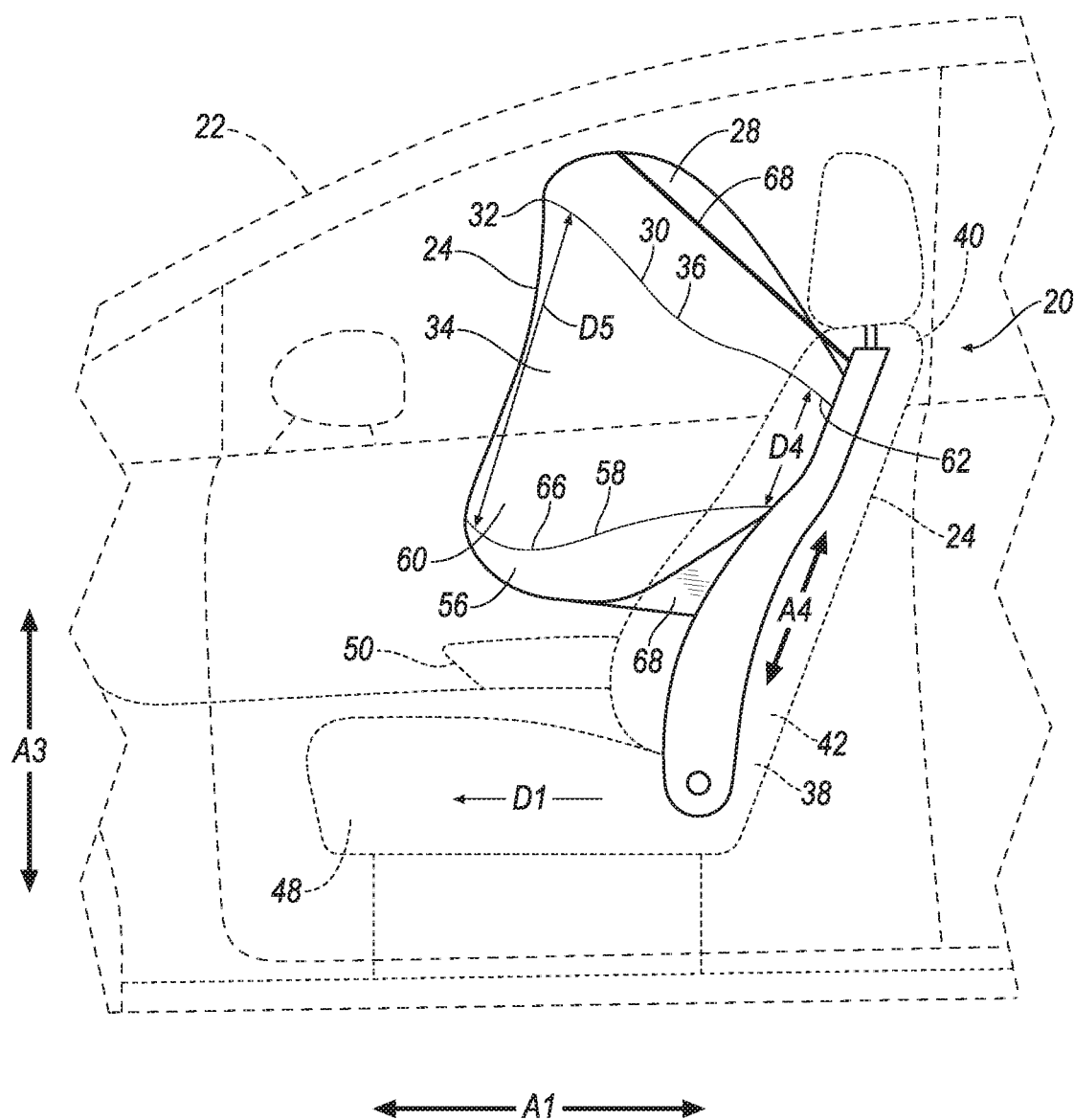
FIG. 3 is a side view of the vehicle with the airbag in the inflated position.

The airbag 26 is inflatable from an uninflated position, shown in FIG. 1, to the inflated position, shown in FIGS. 2-4. The airbag 26 may be inflatable in the seat-forward direction D1. In other words, the airbag 26 in the inflated position and the seat bottom 48 may extend from the seatback 24 in a same direction. For example, the airbag 26 in the inflated position may extend along the seat bottom 48. The airbag 26 in the inflated position may be spaced from the seat bottom 48, e.g., relative to the seatback-vertical axis A4. The airbag 26 in the inflated position may abut the seat bottom 48 (not shown). The airbag 26 in the inflated position may extend above the top 40 of the seatback 24.

The airbag 26 in the inflated position may be directly above the center console 50. In other words, the airbag 26 and the center console 50 may be at a same position along the vehicle-longitudinal axis A1 and the cross-vehicle axis A2, and at different positions along the vehicle-vertical axis A3. For example, the airbag 26 may be at the centerline CL at a same distance from the front of the vehicle 22 as the center console 50.

The top panel 28 of the airbag 26 helps to limit the amount of head excursion of the occupant during a vehicle side impact. The top panel 28 in the inflated position is closer to the top 40 of the seatback 24 than the bottom 42 of the seatback 24.

The top panel 28 of the airbag 26 has the pair of opposing side edges 30. The side edges 30 of the top panel 28 are spaced from each other in the inflated position, e.g., along the cross-vehicle axis A2 and/or the cross-seat axis A5. The side edges 30 of the top panel 28 may be spaced from each other by at least half the distance D2 between the seatbacks 24. For example, a distance D3 between the side edges 30 along the cross-vehicle axis A2 may be greater than half the distance D2 between the seatbacks 24. The side edges 30 of the top panel 28 may be spaced from each other by at least 50 millimeters. In other words, a width of the top panel 28 along the cross-vehicle axis A2 and/or the cross-seat axis A5, e.g., from the seam 36 at one of the side edges 30 to the seam 36 at the other side edge 30 may be at least half the distance D2 between the seatbacks 24, at least 50 millimeters, etc. For example, a width of the airbag 26 in the inflated position along the cross-vehicle axis A2 and/or the cross-seat axis A5 between the main panel 34 at one of the side edges 30 to the main panel 34 at the other side edge 30 may be at least half the distance D2 between the seatbacks 24, at least 50 millimeters, etc. The side edges 30 may be elongated along the vehicle-longitudinal axis A1. The side edges 30 may angle upwardly from the vehicle-longitudinal axis A1 as the side edges 30 extend away from the seatback 24.

The spacing between the side edges 30 helps to reduce the amount of head excursion, e.g., spacing less than 50 millimeters may not provide sufficient reduction of the amount of head excursion. For example, during an impact the airbag 26 in the inflated position controls kinematics of an occupant along the cross-vehicle axis A2. The airbag 26 deforms while controlling such kinematics, decreasing the distance between the side edges 30. For example, the greater the distance the more energy that may be absorbed by the airbag 26, e.g., to control kinematic of the occupant and reduce the amount of head excursion.

The top panel 28 of the airbag 26 has the front edge 32. The front edge 32 extends between the side edges 30. The front edge 32 is at a front of the airbag 26, e.g., relative to the seat-forward direction D1. The front edge 32 may be elongated along the cross-vehicle axis A2, the and/or cross-seat axis A5. The top panel 28 may be a single sheet of material, i.e., a uniform piece of material with no seams, joints, stitching, or fasteners.

The airbag 26 may include a bottom panel 56. The bottom panel 56 is spaced from the top panel 28 along the vehicle-vertical axis A3 when the airbag 26 is in the inflated position. The bottom panel 56 in the inflated position is closer to the bottom of the seatback 24 than the top of the seatback 24.

The bottom panel 56 includes a pair of opposing side edges 58. The side edges 58 of the bottom panel 56 are spaced from each other in the inflated position, e.g., along the cross-vehicle axis A2. The side edges 58 may be elongated along the vehicle-longitudinal axis A1. The side edges 58 may angle downwardly from the vehicle-longitudinal axis A1 as the side edges 58 extend away from the seatback 24.

The bottom panel 56 of the airbag 26 a front edge 60. The front edge 60 extends between the side edges 58. The front edge 60 is at a front of the airbag 26, e.g., relative to the seat-forward direction D1. The front edge 60 may be elongated along the cross-vehicle axis A2 and/or the cross-seat axis A5. The edges 30, 32, 58, 60 may have curves and other deviations from what is described herein, e.g., due to the flexible nature of the airbag 26. The bottom panel 56 may be a single sheet of material.

The main panel 34 of the airbag 26 extends about the top panel 28, e.g., along the side edges 30 and the front edge 32 of the top panel 28. The main panel 34 extends downward from the top panel 28 when the airbag 26 is in the inflated position. For example, the main panel 34 may extend from the top panel 28 to the bottom panel 56. The main panel 34 may extend about the bottom panel 56, e.g., along the side edges 58 and the front edge 60 of the bottom panel 56. The main panel 34 may be a single sheet of material.

The main panel 34 is fixed to the top panel 28 at the first seam 36. For example, the first seam 36 may include stitching, adhesive, etc. The first seam 36 may extend along the side edges 30 and the front edge 32 of the top panel 28. The first seam 36 at one of the side edges 30 of the top panel 28 is spaced from the first seam 36 at another of the side edges 30 of top panel 28 along the cross-seat axis A5, e.g., as describe above for the side edges 30 of the top panel 28.

The first seam 36 extends from a first end 62 to a second end 64. The first end 62 and the second end 64 may be at the seatback 24. The first end 62 and the second end 64 may be at a same position relative to the seatback-vertical axis A4. In other words, the first end 62 and the second end 64 may be a same distance from the top 40 of the seat 38 along the seatback-vertical axis A4. The first seam 36 may extend along the cross-vehicle axis A2 and the vehicle-longitudinal axis A1, e.g., along the side edges 30 and the front edge 32 of the top panel 28. The first seam 36 extends from the seatback 24 about the top panel 28 and back to the seatback 24 in a U-shape, e.g., when viewed from above the airbag 26 relative to the seatback-vertical axis A4.

The top panel 28 may be domed upwardly from the first seam 36 when the airbag 26 is in the inflated position. For example, the top panel 28 may extend from the first seam 36 upwardly, e.g., relative to the vehicle-vertical axis A3 and/or the seatback-vertical axis A4, and arcuately to an apex at a center of the top panel 28. The dome may be caused by the flexible nature of the top panel 28, e.g., inflation gases may urge the top panel 28 outward.

The main panel 34 may be fixed to the bottom panel 56 at a second seam 66. For example, the second seam 66 may include stitching, adhesive, etc. The second seam 66 may extend about the bottom panel 56. For example, the second seam 66 may extend along the side edges 58 and the front edge 60 of the bottom panel 56.

A distance D4 between the first seam 36 and the second seam 66 at the seatback 24, e.g., along the seatback 24 vehicle-vertical axis A3, the vehicle-vertical axis A3, etc., may be less than a distance D5 between the first seam 36 and the second seam 66 at the front edge 60 of the bottom panel 56, e.g., along the seatback-vertical axis A4, the vehicle-vertical axis A3, etc. In other words, the first seam 36 and the second seam 66 may extend away from the seatback 24 and away from each other. For example, the first seam 36 may angle upwardly from the vehicle-longitudinal axis A1 as the first seam 36 extends away from the seatback 24 and the second seam 66 may angle downwardly from the vehicle-longitudinal axis A1 as the second seam 66 extends away from the seatback 24.

The assembly 20 may include one or more tethers 68. The tethers 68 aid in positioning the airbag 26 in the inflated position. The tethers 68 may be woven fabric or any other suitable material. For example, the tethers 68 and the airbag 26 may be a same type of material. One tether 68 may be fixed to the bottom panel 56 and the seatback 24. For example, one tether 68 may be fixed to the bottom panel 56 via stitching, adhesive, etc. Alternately, the tether 68 and the bottom panel 56 may be monolithic, i.e., a continuous one-piece unit without any seams fixing the tether 68 to the bottom panel 56. The tether 68 may be triangular. For example, a length of the tether 68, e.g., between the airbag 26 and the seatback 24 may increase as the tether 68 approaches a distal edge 69. Another tether 68 may be fixed to the top panel 28 and the seatback 24. For example, one tether 68 may be fixed to the top panel 28 via stitching, adhesive, etc. Alternately, the tether 68 and the top panel 28 may be monolithic.

The assembly 20 may include an include an inflator 70. The inflator 70 may be connected to the airbag 26. Upon receiving a signal from, e.g., a computer 74, the inflator 70 may inflate the airbag 26 with an inflatable medium, such as a gas. The inflator 70 may be, for example, a pyrotechnic inflator that uses a chemical reaction to drive inflation medium to the airbag 26. The inflator 70 may be of any suitable type, for example, a cold-gas inflator.

The assembly 20 may include the housing 52. The inflator 70 and the airbag 26 in the uninflated position may be disposed in the housing 52. The housing 52 provides a reaction surface for the airbag 26 in the inflated position. The housing 52 may be supported by the seatback 24 or any other suitable structure e.g., the housing 52 may be fixed to the frame of the seatback 24. The housing 52 may be formed of any material, e.g., a rigid polymer, a metal, a composite, etc.

Figure 5:
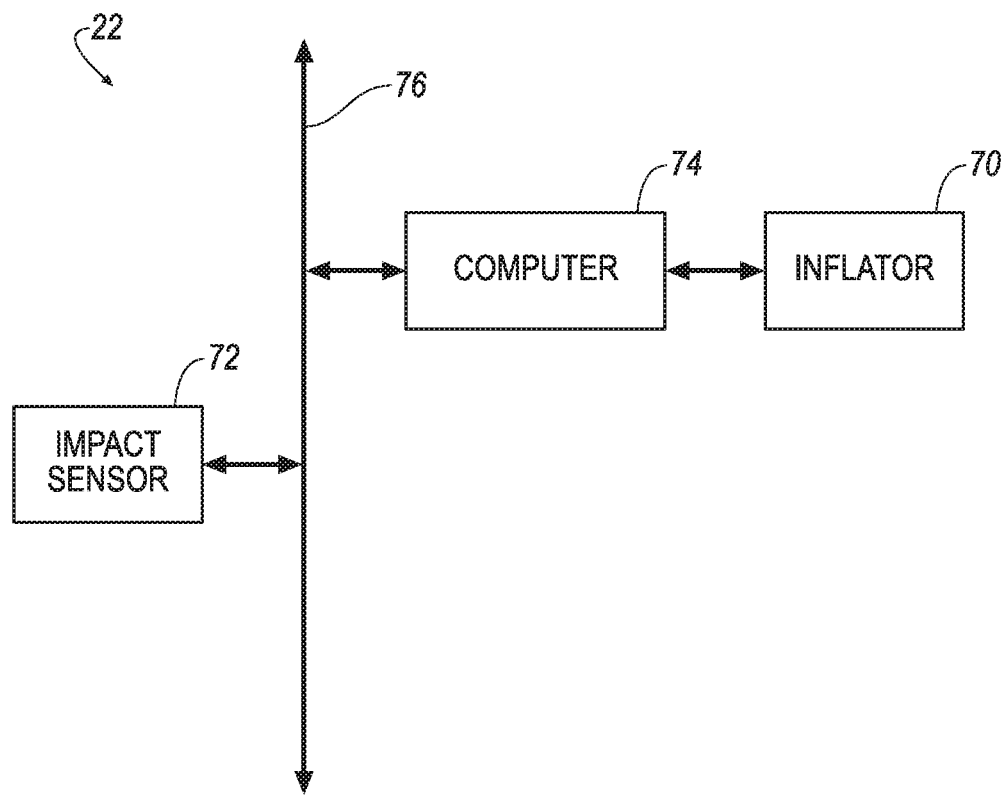
FIG. 5 is a block diagram of components of the vehicle.

The assembly 20 may include an impact sensor 72, shown in FIG. 5. The impact sensor 72 may be in communication with the computer 74. The impact sensor 72 is programmed to detect an impact to the vehicle 22. The impact sensor 72 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 72 may be located at numerous points in or on the vehicle 22.

The vehicle 22 may include a communication network 76. The communication network 76 includes hardware, such as a communication bus, for facilitating communication among vehicle components. For example, the communication network 76 may facilitate wired or wireless communication between the computer 74, the impact sensor 72, the inflator 70, etc., in accordance with a number of communication protocols such as controller area network (CAN), Ethernet, WiFi, Local Interconnect Network (LIN), and/or other wired or wireless mechanisms.

The computer 74 may be a microprocessor-based computer implemented via circuits, chips, or other electronic components. For example, the computer 74 may include a processor, a memory, etc. The memory of the computer 74 may store instructions executable by the processor as well as electronically storing data and/or databases. Although one computer 74 is shown in FIG. 5 for ease of illustration, it is to be understood that the computer 74 could include, and various operations described herein could be carried out by, one or more computing devices.

In the event of an impact, the impact sensor 72 may detect the impact and transmit a signal through the communication network 76 to the computer 74. In response, the computer 74 may transmit a signal through the communication network 76 to the inflator 70. The inflator 70 may discharge and inflate the airbag 26.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a seatback;
   a side airbag supported by the seatback and inflatable to an inflated position including a top panel having a pair of opposing side edges and a front edge extending between the side edges;
   the side airbag in the inflated position including a bottom panel;
   the side airbag including a main panel fixed to the top panel at a seam extending along the side edges and the front edge, the main panel extending from the top panel to the bottom panel in the inflated position; and
   a tether fixed to the bottom panel and the seatback, the tether connected to the bottom panel at the seatback and extending away from the seatback along the bottom panel.

2. The assembly of claim 1, wherein the bottom panel includes a pair of opposing side edges and a front edge extending between the side edges, the main panel fixed to the bottom panel at a second seam extending along the side edges and the front edge of the bottom panel when the side airbag is in the inflated position.

3. The assembly of claim 2, wherein a distance between the seam and the second seam at the seatback is less than a distance between the seam and the second seam at the front edge of the bottom panel.

4. The assembly of claim 1, wherein the tether is triangular.

5. The assembly of claim 1, further comprising a second tether fixed to the top panel and the seatback.

6. The assembly of claim 1, wherein the main panel is a single sheet of material.

7. The assembly of claim 1, wherein the side airbag is inflatable in a seat-forward direction from an uninflated position to the inflated position.

8. The assembly of claim 1, wherein the seam at one of the side edges of the top panel is spaced from the seam at the other of the side edges along a cross-seat axis.

9. The assembly of claim 1, wherein the opposing side edges of the top panel are spaced from each other by at least 50 millimeters in the inflated position.

10. The assembly of claim 1, wherein the top panel is domed upwardly from the seam.

11. The assembly of claim 1, wherein the seam is U-shaped.

12. The assembly of claim 1, wherein the seam extends from a first end to a second end, the first end and the second end at a same position relative to a seatback-vertical axis.

13. An assembly, comprising:
    a seatback having a vehicle-inboard side;
    an airbag supported by the seatback at the vehicle-inboard side and inflatable to an inflated position including a top panel having a pair of opposing side edges and a front edge extending between the side edges;
    the airbag in the inflated position including a bottom panel;
    the airbag including a main panel fixed to the top panel at a seam extending along the side edges and the front edge, the main panel extending from the top panel to the bottom panel in the inflated position; and
    a tether fixed to the bottom panel and the seatback, the tether connected to the bottom panel at the seatback and extending away from the seatback along the bottom panel.

14. The assembly of claim 13, further comprising a second seatback spaced from the seatback along a cross-vehicle axis by a distance, and the side edges of the top panel are spaced from each other along the cross-vehicle axis by at least half the distance between the seatback and the second seatback.

15. The assembly of claim 13, further comprising a center console, wherein the airbag in the inflated position is directly above the center console.

16. The assembly of claim 13, further comprising a seat bottom supporting the seatback, the airbag in the inflated position extending along the seat bottom.

17. The assembly of claim 13, wherein the seam extends along a cross-vehicle axis and a vehicle-longitudinal axis.

18. The assembly of claim 13, wherein the bottom panel is spaced from the top panel along a vehicle-vertical axis, and the main panel is fixed to the bottom panel at a second seam extending about the bottom panel.

\* \* \* \* \*